(12) United States Patent
Austen et al.

(10) Patent No.: US 6,915,460 B2
(45) Date of Patent: Jul. 5, 2005

(54) METHOD, APPARATUS, AND PROGRAM FOR SERVICE PROCESSOR SURVEILLANCE WITH MULTIPLE PARTITIONS

(75) Inventors: Christopher Harry Austen, Austin, TX (US); Douglas Wayne Oliver, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 09/891,339

(22) Filed: Jun. 26, 2001

(65) Prior Publication Data

US 2002/0199138 A1 Dec. 26, 2002

(51) Int. Cl.[7] .............................................. G06F 11/00
(52) U.S. Cl. ...................................... 714/55; 709/215
(58) Field of Search ............................... 714/55, 2, 25, 714/47, 48; 709/214, 215, 216

(56) References Cited

U.S. PATENT DOCUMENTS

| | | | | |
|---|---|---|---|---|
| 4,455,601 A | | 6/1984 | Griscom et al. ............. | 364/200 |
| 4,959,849 A | * | 9/1990 | Bhusri ...................... | 379/32.01 |
| 5,129,079 A | * | 7/1992 | Miyashita ................... | 712/211 |
| 5,671,390 A | * | 9/1997 | Brady et al. ................ | 711/113 |
| 5,878,205 A | | 3/1999 | Greenstein et al. ..... | 395/182.09 |
| 5,991,881 A | * | 11/1999 | Conklin et al. ............. | 713/201 |
| 6,065,139 A | | 5/2000 | Mehta et al. ................. | 714/55 |
| 6,314,476 B1 | * | 11/2001 | Ohara ......................... | 710/15 |
| 6,321,338 B1 | * | 11/2001 | Porras et al. ............... | 713/201 |
| 6,425,093 B1 | * | 7/2002 | Singh et al. ................. | 714/38 |
| 6,609,036 B1 | * | 8/2003 | Bickford ..................... | 700/30 |
| 6,622,260 B1 | * | 9/2003 | Marisetty et al. ............ | 714/10 |

* cited by examiner

*Primary Examiner*—Dieu-Minh Le
(74) *Attorney, Agent, or Firm*—Duke W. Yee; Mark E. McBurney; Gerald H. Glanzman

(57) ABSTRACT

A service processor surveillance mechanism is provided for multiple partitions. Each partition stores its own official response. The surveillance routine checks to see if it has enough time for the service processor to respond to its previous probe. If sufficient time has not passed, the surveillance code returns to the calling function with the partition's official response. If sufficient time has passed, the surveillance code reads the surveillance byte in nonvolatile random access memory. The surveillance code then determines the current state of the service processor and determines whether the official response needs to be updated. If the surveillance code updates the official response, the partition's official response is set to the updated official response and returns the partition's official response. If the official response has not changed since the last time the partition probed the surveillance byte, then the surveillance code returns a neutral value.

28 Claims, 2 Drawing Sheets

METHOD, APPARATUS, AND PROGRAM FOR SERVICE PROCESSOR SURVEILLANCE WITH MULTIPLE PARTITIONS

BACKGROUND OF THE INVENTION

1. Technical Field

The present invention relates to data processing and, in particular, to multiprocessing systems. Still more particularly, the present invention provides a method, apparatus, and program for service processor surveillance with multiple partitions.

2. Description of Related Art

Symmetric Multiprocessing (SMP) is a multiprocessing architecture in which multiple central processing units (CPUs), residing in one cabinet, share the same memory. SMP systems provide scalability. As business increases, additional CPUs can be added to absorb the increased transaction volume.

Logical partitioning (LPAR) is a logical segmentation of a computer's memory and other resources that allows each CPU to run its own copy of the operating system (OS) and associated applications. LPARs are caused by special hardware circuits and allow multiple system images to run in one machine. This can be multiple instances of the same operating system or different operating systems.

In an LPAR environment, multiple partitions try to monitor the status of the service processor. Each partition probes the surveillance byte in nonvolatile random access memory (NVRAM). If the service processor is in error a partition toggles the surveillance byte and resets the service processor. However, if more than one partition probes the surveillance byte at the same time or before the service processor has a chance to respond, each partition could attempt to reset the service processor and report an error to the partition's operating system.

Another problem that may arise is if the service processor is reset and an error log is generated for the partition's operating system, no other partition will know that the service processor is in error and thus will not generate an error log for its partition's operating system.

Therefore, it would be advantageous to provide a method, apparatus, and program for serializing the surveillance probing and customizing the reporting of the service processor to each partition.

SUMMARY OF THE INVENTION

The present invention provides a service processor surveillance mechanism for multiple partitions. Each partition stores its own official response. A partition calls surveillance code that checks if any other partition is executing the surveillance code via a lock. If the code is locked, the surveillance code returns the official response to the calling partition. If the surveillance routine is not locked, the routine checks to see if it has enough time for the service processor to respond to its previous probe. If sufficient time has not passed, the surveillance code returns to the calling function with the partition's official response.

If sufficient time has passed, the surveillance code reads the surveillance byte in nonvolatile random access memory. The surveillance code then determines the current state of the service processor and determines whether the official response needs to be updated. If the surveillance code updates the official response, the partition's official response is set to the updated official response and returns the partition's official response. If the official response has not changed since the last time the partition probed the surveillance byte, then the surveillance code returns a neutral value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
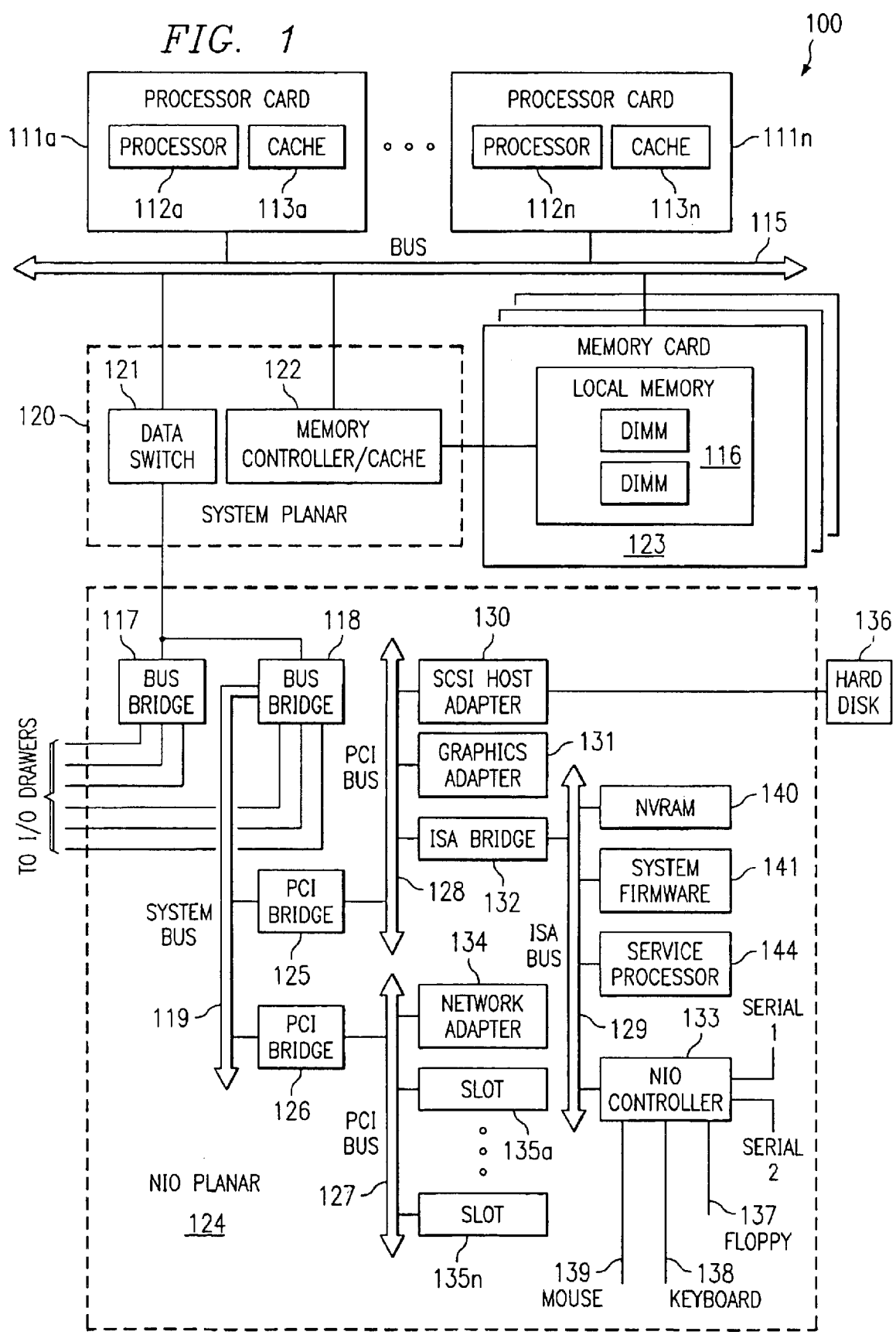
FIG. 1 depicts a block diagram of an illustrative embodiment of a data processing system with which the present invention may advantageously be utilized.

Referring now to the drawings and in particular to FIG. 1, there is depicted a block diagram of an illustrative embodiment of a data processing system with which the present invention may advantageously be utilized. As shown, data processing system 100 includes processor cards 111a–111n. Each of processor cards 111a–111n includes a processor and a cache memory. For example, processor card 111a contains processor 112a and cache memory 113a, and processor card 111n contains processor 112n and cache memory 113n.

Processor cards 111a–111n are connected to main bus 115. Main bus 115 supports a system planar 120 that contains processor cards 111a–111n and memory cards 123. The system planar also contains data switch 121 and memory controller/cache 122. Memory controller/cache 122 supports memory cards 123 that includes local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a–135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection 137, keyboard connection 138, and mouse connection 139 are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

In accordance with a preferred embodiment of the present invention, surveillance code running on processors 112a–112n and service processor 144 toggle a surveillance byte in NVRAM 140. For example, an operating system running on processor 112a may read the surveillance byte and write a zero and service processor may read the surveillance byte and write a one. Thus, when it is time for processor 112a to write a zero again, the service processor should have written a one in the surveillance byte in NVRAM. If the surveillance byte is not one, the service processor did not write and may be in error. More particularly, processor 112a may write a zero and processor 112n may attempt to write a zero before service processor 144 has a chance to write a one. Thus, service processor 112n may inaccurately report that the service processor is in error.

Figure 2:
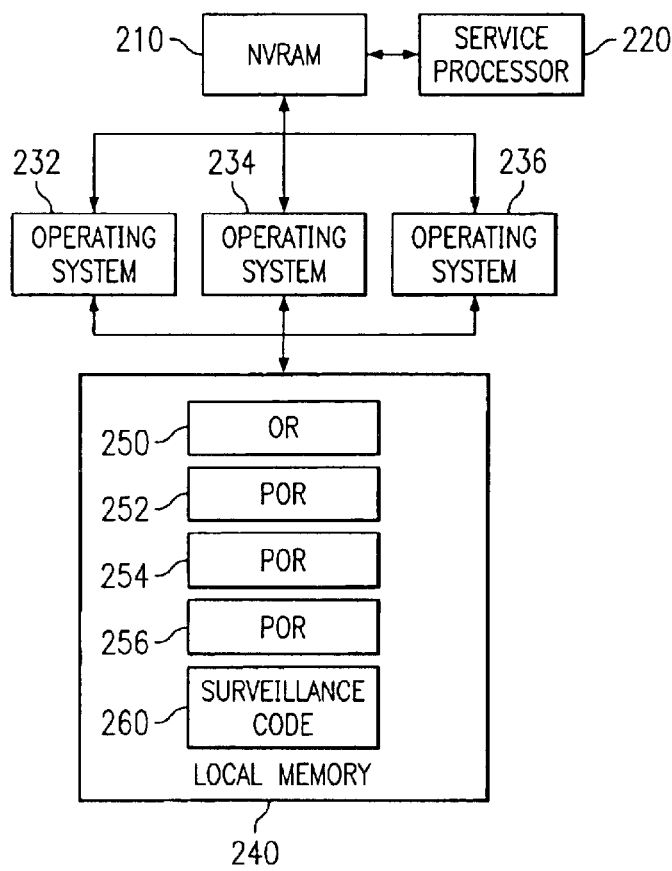
FIG. 2 is a block diagram of a logical partition system with service processor surveillance in accordance with a preferred embodiment of the present invention.

With reference now to FIG. 2, a block diagram of a logical partition system with service processor surveillance is illustrated in accordance with a preferred embodiment of the present invention. NVRAM 210 stores a surveillance byte, which is toggled by service processor (SP) 220 and partition operating systems 232, 234, 236. For example, service processor 220 may write a one in NVRAM and each of operating systems 232, 234, 236 calls surveillance code 260, which resides in local memory 240, to read NVRAM. If the surveillance byte in NVRAM is one, the partition operating system writes a zero. This is referred to as "probing" the surveillance byte.

A problem may arise when an operating system attempts to probe the surveillance byte before the service processor has a chance to respond. For example, service processor 220 may write a one in NVRAM 210. Operating system 232 may read the surveillance byte, determine that the service processor is not in error and write a zero in NVRAM. Before the service processor has a chance to respond, operating system 234 may then read the surveillance byte, which stores a zero, and incorrectly determine that the service processor is in error. As another example, operating system 236 may read the surveillance byte and determine that the service processor is in error. Operating system 236 would then reset the service processor and surveillance code 260 would generate an error log for operating system 236. However, operating system 232 may then read the surveillance byte and determine that the service processor is in error, not knowing that operating system 236 already generated an error log and reset the service processor.

In accordance with a preferred embodiment of the present invention, official response (OR) 250 stores the state of the service processor, which may be "good" or "bad." This may be stored numerically. For example, a zero may indicate that the service processor is "good" and a one may indicate that the service processor is "bad." If the surveillance code reads the surveillance byte and determines that the service processor is not in error, the surveillance code may write a zero into OR 250, if necessary. If the surveillance code reads the surveillance byte and determines that the service processor is in error, the surveillance code may write a one into OR 250.

When a partition calls surveillance code 260, the code may be locked. Thus, when a second partition attempts to call the surveillance code and the code is locked, the second partition may simply return the official response without probing the surveillance byte. Furthermore, surveillance code 260 may set a time period during which the operating systems cannot probe the surveillance byte. Thus, if an operating system calls the surveillance code and the time period has not elapsed, the surveillance code will not perform the surveillance test. In this case, the surveillance code may simply return the official response. The time period preferably will be set to a value equal to at least the amount of time between service processor probes. For example, if service processor 220 writes to NVRAM 210 every one minute, the time period should be at least one minute.

If the official response is not updated, the surveillance code may return the same OR to a partition multiple times. For example, operating system 234 may determine that service processor 220 is in error and update OR 250. Surveillance code 260, on a subsequent probe by operating system 234, may determine that the service processor is in error and return the official response. However, because the OR can only be either "good" or "bad," the partition may report the same error to its operating system multiple times.

In accordance with a preferred embodiment of the present invention, local memory stores partition official responses 252, 254, 256 corresponding to operating systems 232, 234, 236, respectively. When each partition checks the official response, the surveillance code determines whether the partition official response (POR) for the respective operating system is equal to the official response. If the POR is equal to the official response, the surveillance code may set the return value to a neutral response to indicate that the official response has not changed since the last time that particular partition probed the surveillance byte. If, however, the POR is not equal to the OR, the surveillance code updates the POR to be equal to the OR and sets the return value to the POR.

Official response 250 may store values other than "good" and "bad." For example, zero may indicate that the service processor is good or not in error; a one may indicate that the service processor was found in error and that the reporting partition reset the service processor; a two may indicate that the service processor was found in error after another partition reset the service processor; a three may instruct an administrator to perform a hard reset on the service processor; and, a four may instruct an administrator to replace the service processor. These values are exemplary and other combinations of values may be used to indicate the state of the service processor in the official response. Each partition official response 252, 254, 256 may store these values or a neutral value to indicate that the status has not changed since the last time that partition probed the surveillance byte.

Figure 3:
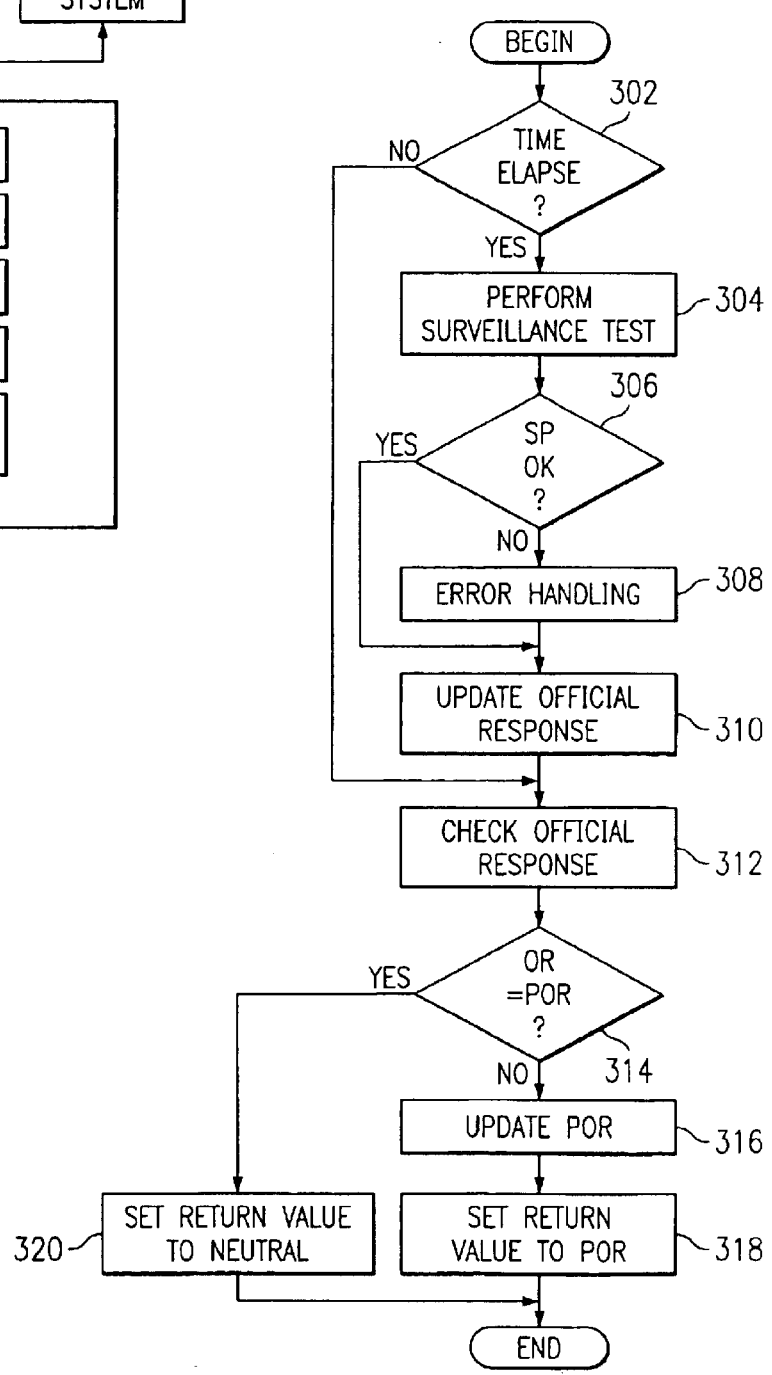
FIG. 3 is a flowchart illustrating the operation of a surveillance process in accordance with a preferred embodiment of the present invention.

Turning now to FIG. 3, a flowchart is shown illustrating the operation of a surveillance process in accordance with a preferred embodiment of the present invention. The process begins and a determination is made as to whether a predetermined period of time has elapsed since the last probe (step 302). If the period of time has elapsed, the process performs the surveillance test (step 304) and a determination is made as to whether the service processor is good (step 306).

If the service processor is in error, the process performs error handling (step 308) and updates the official response (step 310). If the service processor is good in step 306, the process proceeds directly to step 310 to update the official response. Next, the process checks the official response (step 312). If the predetermined period of time has not elapsed in step 302, the process proceeds directly to step 312 to check the official response.

Thereafter, a determination is made as to whether the official response is equal to the official response for that partition (step 314). If the official response is not equal to the POR, the process updates the POR (step 316), sets the return value to the POR (step 318) and ends. If the official response is equal to the POR in step 314, the process sets the return value to a neutral value (step 320) and ends.

Thus, the present invention solves the disadvantages of the prior art by providing a service processor surveillance mechanism for multiple partitions. Each partition stores its own official response. The surveillance routine checks to see if it has enough time for the service processor to respond to its previous probe. If sufficient time has not passed, the surveillance code returns to the calling function with the partition's official response. If sufficient time has passed, the surveillance code reads the surveillance byte in nonvolatile random access memory. The surveillance code then determines the current state of the service processor and determines whether the official response needs to be updated. If the surveillance code updates the official response, the partition's official response is set to the updated official response and returns the partition's official response. If the official response has not changed since the last time the partition probed the surveillance byte, then the surveillance code returns a neutral value.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for service processor surveillance for a system having multiple partitions, comprising:

receiving a service processor status request from one partition of a plurality of partitions;

determining if a predetermined time period has elapsed;

performing a surveillance test for the service processor if the predetermined time period has elapsed;

updating an official response for the surveillance test; and returning a status for the service processor to the one partition of the plurality of partitions.

2. The method of claim 1, wherein the step of performing the surveillance test comprises:

reading surveillance information; and determining whether the service processor has written to the surveillance information.

3. The method of claim 2, wherein the step of performing the surveillance test further comprises writing to the surveillance information.

4. The method of claim 2, wherein the surveillance information comprises a surveillance byte in nonvolatile random access memory.

5. The method of claim 1, further comprising:

performing error handling if the service processor is in error.

6. The method of claim 1, wherein the status comprises the official response.

7. The method of claim 1, further comprising:

comparing the official response to a partition official response associated with the one partition; and setting the partition official response to be equal to the official response if the official response is not equal to the partition official response.

8. The method of claim 7, wherein the status comprises the partition official response.

9. The method of claim 7, wherein the status comprises a neutral value if the official response is equal to the partition official response.

10. A method for service processor surveillance for a system having multiple partitions, comprising:

receiving a service processor status request from one partition of a plurality of partitions;

determining whether a predetermined time period has elapsed;

performing a surveillance test for the service processor if the predetermined time period has elapsed; and returning a status for the service processor to the one partition of the plurality of partitions.

11. The method of claim 10, wherein the step of performing the surveillance test comprises:

reading surveillance information; and determining whether the service processor has written to the surveillance information.

12. The method of claim 11, wherein the step of performing the surveillance test further comprises writing to the surveillance information.

13. The method of claim 11, wherein the surveillance information comprises a surveillance byte in nonvolatile random access memory.

14. An apparatus for service processor surveillance for a system having multiple partitions, comprising:

receipt means for receiving a service processor status request from one partition of a plurality of partitions;

determining means for determining if a predetermined time period has elapsed;

surveillance means for performing a surveillance test for the service processor if the predetermined time period has elapsed;

update means for updating an official response for the surveillance test; and return means for returning a status for the service processor to the one partition of the plurality of partitions.

15. The apparatus of claim 14, wherein the surveillance means comprises:

reading means for reading surveillance information; and determination means for determining whether the service processor has written to the surveillance information.

16. The apparatus of claim 15, wherein the surveillance means further comprises means for writing to the surveillance information.

17. The apparatus of claim 15, wherein the surveillance information comprises a surveillance byte in nonvolatile random access memory.

18. The apparatus of claim 14, further comprising:

means for performing error handling if the service processor is in error.

19. The apparatus of claim 14, wherein the status comprises the official response.

20. The apparatus of claim 14, further comprising:

means for comparing the official response to a partition official response associated with the one partition; and means for setting the partition official response to be equal to the official response if the official response is not equal to the partition official response.

21. The apparatus of claim 20, wherein the status comprises the partition official response.

22. The apparatus of claim 20, wherein the status comprises a neutral value if the official response is equal to the partition official response.

23. An apparatus for service processor surveillance for a system having multiple partitions, composing:

receipt means for receiving a service processor status request from one partition of a plurality of partitions;

means for determining whether a predetermined time period has elapsed;

surveillance means for performing a surveillance test for the service processor if the predetermined time period has elapsed; and return means for returning a status for the service processor to the one partition of the plurality of partitions.

24. The apparatus of claim 23, wherein the surveillance means comprises:

reading means for reading surveillance information; and determination means for determining whether the service processor has written to the surveillance information.

25. The apparatus of claim 24, wherein the surveillance means further comprises means for writing to the surveillance information.

26. The apparatus of claim 24, wherein the surveillance information comprises a surveillance byte in nonvolatile random access memory.

27. A computer program product, in a computer readable medium, for service processor surveillance for a system having multiple partitions, comprising:

instructions for receiving a service processor status request from one partition of a plurality of partitions;

instructions for determining if a predetermined time period has elapsed;

instructions for performing a surveillance test for the service processor if the predetermined time period has elapsed;

instructions for updating an official response for the surveillance test; and instructions for returning a status for the service processor to the one partition of the plurality of partitions.

28. A computer program product, in a computer readable medium, for service processor surveillance for a system having multiple partitions, comprising:

instructions for receiving a service processor status request from one partition of a plurality of partitions;

instructions for determining whether a predetermined time period has elapsed;

instructions for performing a surveillance test for the service processor if the predetermined time period has elapsed; and instructions for returning a status for the service processor to the one partition of the plurality of partitions.

* * * * *

UNITED STATES PATENT AND TRADEMARK OFFICE
CERTIFICATE OF CORRECTION

PATENT NO. : 6,915,460 B2  Page 1 of 1
APPLICATION NO. : 09/891339
DATED : July 5, 2005
INVENTOR(S) : Austen et al.

It is certified that error appears in the above-identified patent and that said Letters Patent is hereby corrected as shown below:

Col. 7, line 47: after "partitions" delete "composing" and insert --comprising--.

Signed and Sealed this

Fifth Day of December, 2006

JON W. DUDAS
*Director of the United States Patent and Trademark Office*